US012690521B2

(12) United States Patent
Somarowthu et al.

(10) Patent No.: US 12,690,521 B2
(45) Date of Patent: Jul. 28, 2026

(54) WINDROW WIDTH AND VOLUMETRIC SPREAD MEASUREMENT OF MOWER IMPLEMENT

(71) Applicant: DEERE & COMPANY, Moline, IL (US)

(72) Inventors: Mahesh Somarowthu, Pune (IN); Aashish Sud, Dera Bassi (IN); Manu Gupta, Pune (IN); Amit A. Naik, Corlim (IN); Brij N. Singh, West Fargo, ND (US)

(73) Assignee: Deere & Company, Moline, IL (US)

( * ) Notice: Subject to any disclaimer, the term of this patent is extended or adjusted under 35 U.S.C. 154(b) by 416 days.

(21) Appl. No.: 18/358,063

(22) Filed: Jul. 25, 2023

(65) Prior Publication Data

US 2025/0031624 A1      Jan. 30, 2025

(51) Int. Cl.
*A01D 57/00* (2006.01)
*A01D 43/10* (2006.01)
*G01N 21/31* (2006.01)

(52) U.S. Cl.
CPC ........... *A01D 57/00* (2013.01); *A01D 43/102* (2013.01); *G01N 21/31* (2013.01)

(58) Field of Classification Search
CPC ............................. A01D 43/102; G01N 21/31
See application file for complete search history.

(56) References Cited

U.S. PATENT DOCUMENTS 6,160,902 A    12/2000 Dickson et al.
7,086,942 B2    8/2006 Niermann et al.
(Continued)

FOREIGN PATENT DOCUMENTS

| CA | 3086545 A1 | 2/2021 | |
|---|---|---|---|
| EP | 3772269 A1 * | 2/2021 | ......... A01D 41/1271 |
| WO | WO 2021214580 A1 | 10/2021 | |

OTHER PUBLICATIONS

Gu, Y., J. F. Brown, J. P. Verdin, and B. Wardlow (2007), A five-year analysis of Modis NDVI and NDWI for grassland drought assessment over the central Great Plains of the United States, Geophys. Res. Lett., 34, L06407, doi: 10.1029/2006GL029127. (Year : 2007).*

(Continued)

*Primary Examiner* — Scott A Browne
*Assistant Examiner* — Josephine Elizabeth Rich
(74) *Attorney, Agent, or Firm* — Taft Stettinius & Hollister LLP; Stephen F. Rost

(57)        ABSTRACT

A mower implement comprising may include a main frame, a cutter assembly, a hyperspectral sensor, and a controller. The hyperspectral sensor is coupled to the main frame, receives reflectance from a target area disposed rearward of the cutter assembly and including the windrow, and generates a signal indicative of light spectrums of the target area. The controller has a processor and a memory having a windrow distribution algorithm stored therein. The processor is operable to execute the windrow distribution algorithm to: receive the signal indicative of the light spectrums of the target area from the hyperspectral sensor; calculate a normalized difference index based on the signal indicative of the light spectrums of the target area; estimate a volumetric spread of the windrow; and control a machine system based on the volumetric spread. The machine system includes one of a display, an actuator, and a drivetrain component.

18 Claims, 8 Drawing Sheets

(56)     References Cited

U.S. PATENT DOCUMENTS

| | | | |
|---|---|---|---|
| 10,188,025 B2 | 1/2019 | Kirk et al. | |
| 2015/0379721 A1 | 12/2015 | Good et al. | |
| 2018/0189564 A1* | 7/2018 | Freitag | G06F 18/214 |
| 2019/0162855 A1 | 5/2019 | McPeek | |
| 2021/0116361 A1* | 4/2021 | Olander | G01N 21/55 |
| 2021/0350295 A1* | 11/2021 | Singh | G06Q 30/0205 |
| 2022/0386533 A1* | 12/2022 | Hill | A01D 57/26 |

OTHER PUBLICATIONS

F. Khalesi, "UAV in Precision Agriculture: a Preliminary Assessment of Uncertainty for Vegetation Health Index," 2022 IEEE Workshop on Metrology for Agriculture and Forestry (MetroAgriFor), Perugia, Italy, 2022, pp. 94-99, doi: 10.1109/MetroAgriFor55389.2022.9964645. (Year: 2022).*

Extended European Search Report and Written Opinion issued in European Patent Application No. 24186695.3 dated Dec. 5, 2024, in 09 pages.

* cited by examiner

WINDROW WIDTH AND VOLUMETRIC SPREAD MEASUREMENT OF MOWER IMPLEMENT

CROSS-REFERENCE TO RELATED APPLICATIONS

N/A.

TECHNICAL FIELD

The present disclosure relates generally to a mower implement used to sever crop material and lay windrows thereof.

BACKGROUND

A mower implement, including a self-propelled wind-rower, a sickle bar mower, a disc mower, a mower condi-tioner, etc., may sever crop material and form windrows behind thereof. With appropriate spread of the windrows and width, the cut crop material can drydown and be harvested by a baler implement. A red, green, and blue wavelengths camera (RGB camera) may be equipped on the mower implement to capture the image of the windrow for an operator to view through a display. However, different ambient light conditions, such as sunrise, sunset, extreme sunny condition, or extreme low light condition, may affect the quality or contrast of the image.

SUMMARY

According to an aspect of the present disclosure, a mower implement comprising may include a main frame, a cutter assembly, a hyperspectral sensor, and a controller. The cutter assembly is coupled to the main frame and is operable to cut a crop material and form the cut crop material into a windrow. The hyperspectral sensor is coupled to the main frame, receives reflectance from a target area disposed rearward of the cutter assembly and including the windrow, and generates a signal indicative of light spectrums of the target area. The controller has a processor and a memory having a windrow distribution algorithm stored therein. The processor is operable to execute the windrow distribution algorithm to: receive the signal indicative of the light spectrums of the target area from the hyperspectral sensor; calculate a normalized difference index based on the signal indicative of the light spectrums of the target area; estimate a volumetric spread of the windrow; and control a machine system based on the volumetric spread. The machine system may include one of a display, an actuator, and a drivetrain component.

A method of controlling a machine system of the mower implement, the method comprising: receiving reflectance from a target area covering the windrow by a hyperspectral sensor; generating a signal indicative of spectrums of the target area by the hyperspectral sensor; receiving the signal indicative the spectrums of the target area from the hyper-spectral sensor, calculating a normalized difference index based on signal indicative of the spectrums of the target area, estimating volumetric spread of the windrow, and control-ling a machine system based on the volumetric spread by the controller.

Other features and aspects will become apparent by consideration of the detailed description, claims, and accom-panying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

The present disclosure includes a mower implement hav-ing a hyperspectral sensor, which is an alternative or addi-tion to a red, green, and blue wavelengths camera (RGB camera). The RGB camera receives visible spectrum from about a 400-nanometer wavelength to about an 800-nano-meter wavelength. The hyperspectral sensor is configured for hyperspectral sensing, which detects the light beyond the visible spectrum and reflected from a target area behind a mower implement. Signals generated by the hyperspectral sensor are received by a controller to estimate a width of a windrow in the target area and a volumetric spread of the windrow and to manipulate and/or control a machine system that may change the width or volumetric spread of the windrow. The information regarding the width or volumetric spread of the windrow may later be used by another agri-cultural implement, such as a baler implement. A more detailed description is provided in the following paragraphs.

Figure 1:
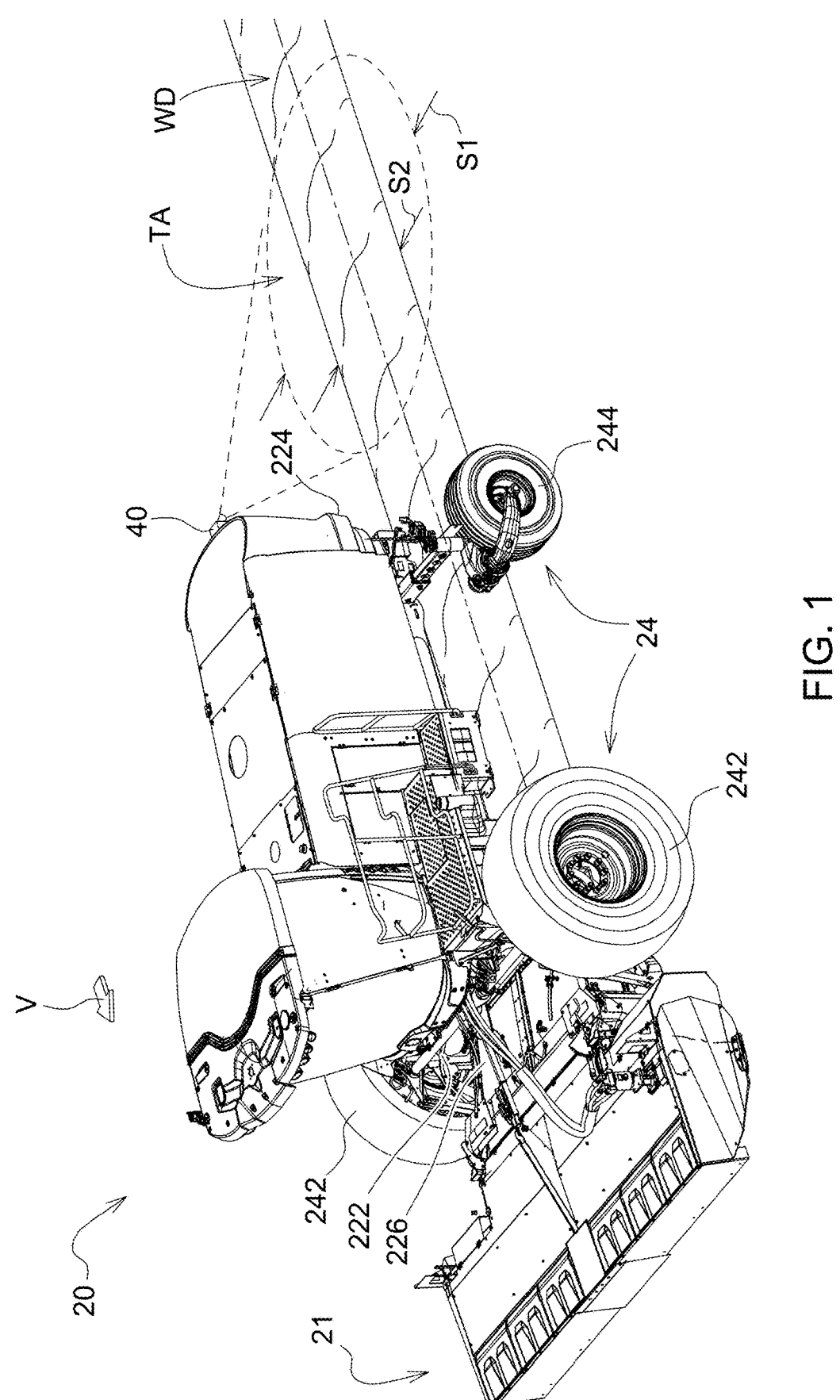
FIG. 1 is a perspective view of a mower implement.

Referring to FIG. 1, a mower implement 20, in one example, is a self-propelled windrower that mows and collects standing crop in a field when the mower implement 20 travels in a first direction V. The self-propelled wind-rower is driven by a drivetrain component 23 (in FIG. 3). The mower implement 20 may then condition the cut crop material to decrease the drydown time of a windrow WD returned by the mower implement 20. The mower imple-ment 20 in another implementation may be pulled by a work vehicle, such as a tractor; the mower implement may include a mower-conditioner, a disc mower, a sickle bar mower, etc.

Figure 2:
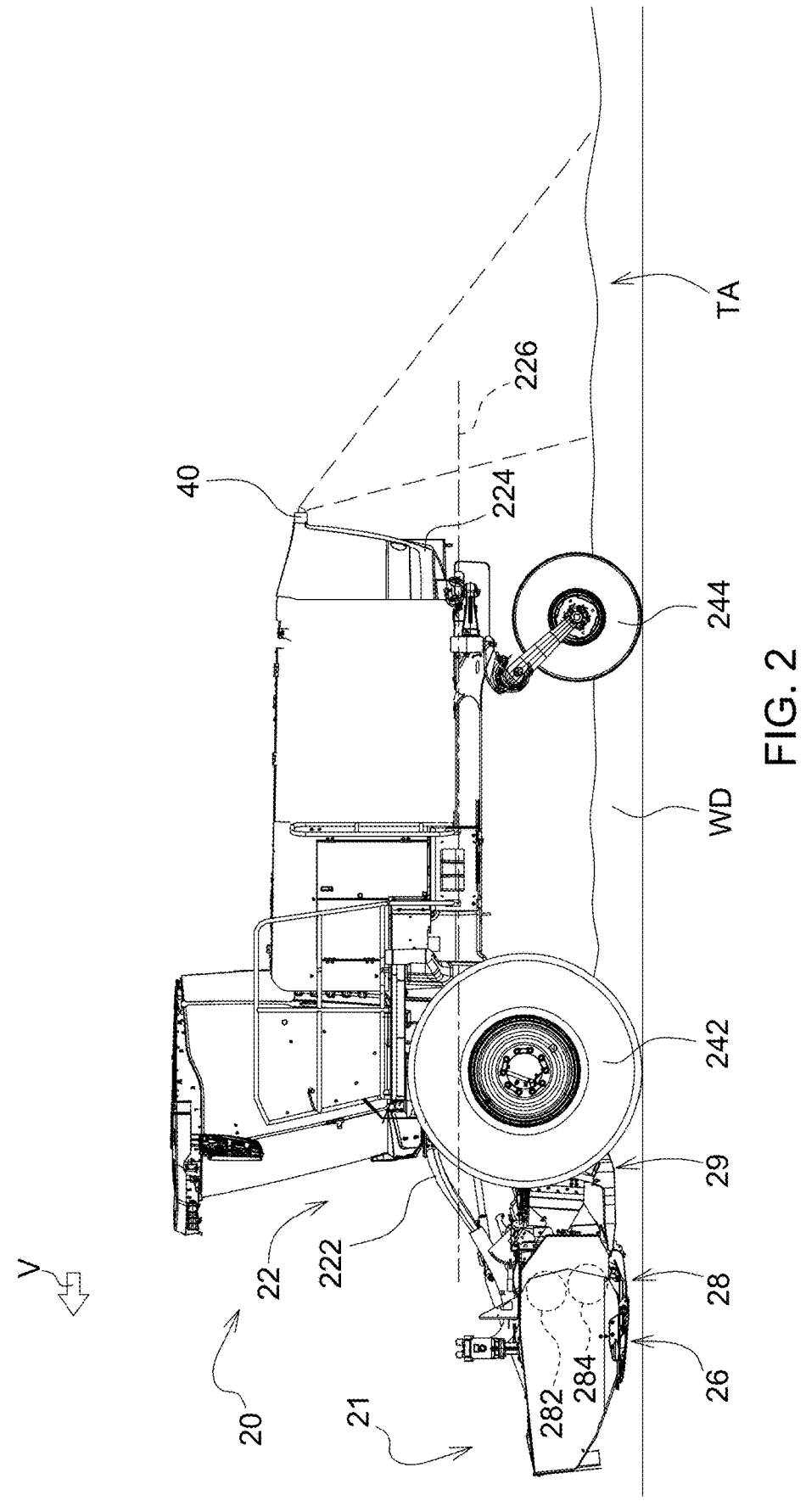
FIG. 2 is a side view of the mower implement of FIG. 1.
Figure 3:
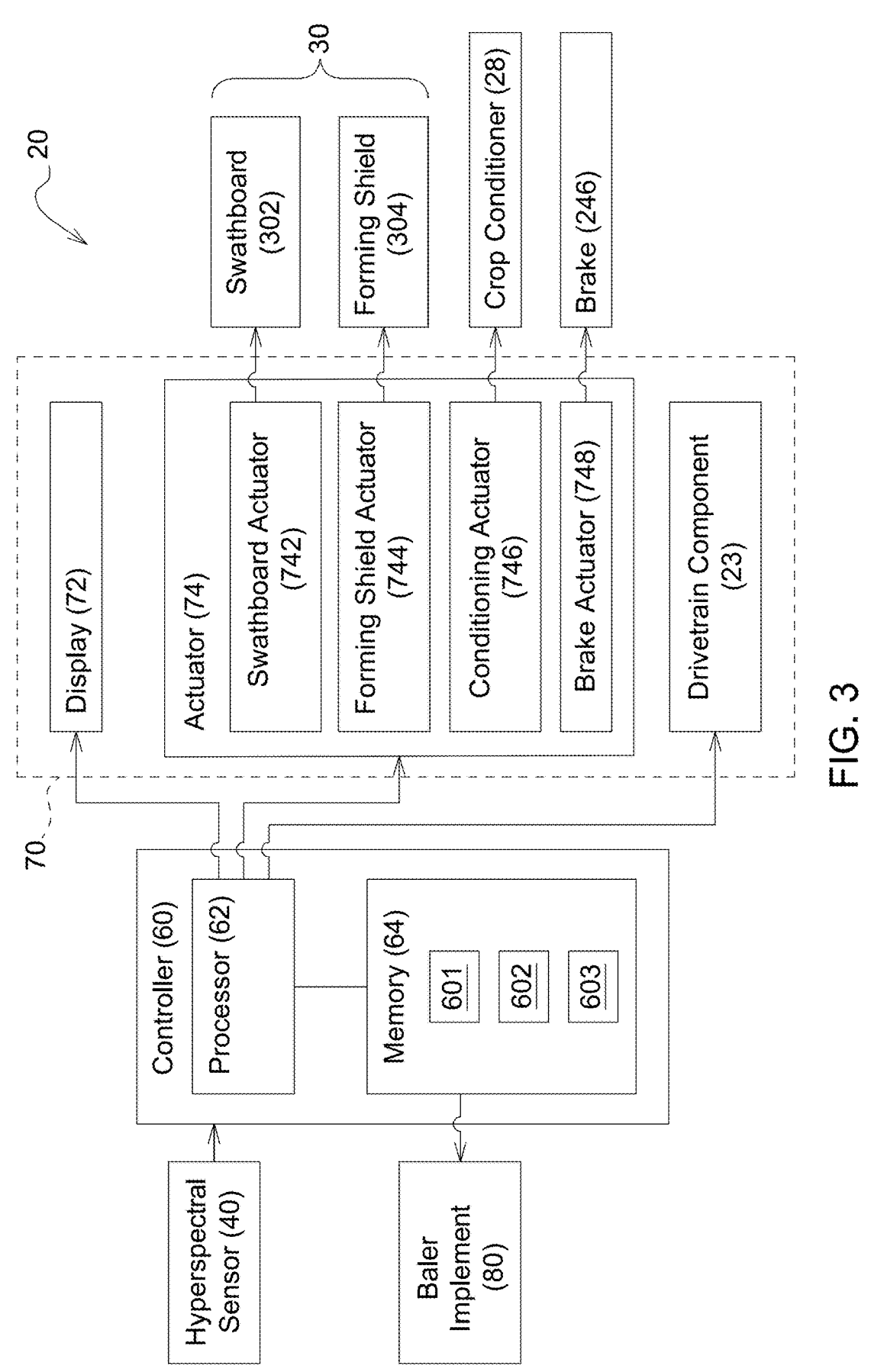
FIG. 3 is a block diagram illustrating inputs/outputs of a controller to display the volumetric spread of the windrow and/or to control the distribution of the window.

Referring to FIGS. 1 and 2, the mower implement 20 may include a header 21, a main frame 22, a ground engaging device 24, a cutter assembly 26, a crop conditioner 28, and a crop flow control assembly 30 (FIG. 3). The main frame 22 extends along a central longitudinal axis 226 between a forward end 222 and a rearward end 224 relative to a direction of travel (first direction V). The header 21 of the mower implement 20, in the present implementation, is coupled to the forward end 222 of the main frame 22 and is operable to cut the crop material with cutter assembly 26 and to condition the cut crop with the crop conditioner 28 prior to forming the crop material into the windrow WD. In another implementation (not shown), where the mower implement 20 is pulled by the work vehicle, the forward end 222 and rearward end 224 are defined on the header 21 which may include the cutter assembly 26 or both cutter assembly 26 and crop conditioner 28.

The ground engaging device 24, such as but not limited to one or more wheels and/or tracks, are attached to the main frame 22. In the implementation shown in FIGS. 1 and 2, the ground engaging device 24 includes two front wheels 242 driven by the drivetrain component 23 (FIG. 3) and two rear wheels 244 caster mounted on the rear portion of the mower implement 20. When the windrow WD is returned from the header 21, the windrow WD is disposed under the main frame 22 and between the front wheels 242 and between the rear wheels 244 in a lateral direction perpendicular to the central longitudinal axis 226.

As is understood by those skilled in the art, the header 21 may be varied, such as but not limited to a rotatory platform (as shown in FIG. 1) and a draper platform. The cutter assembly 26 of the header 21 severs the crop material. The cutter assembly 26 may include different types of cutting devices, such as but not limited to a rotary disc cutter and cutter bar. The crop conditioner 28 is disposed downstream of the cutter assembly 26 and upstream of a discharge outlet 29 relative to a direction of travel of the crop material. The crop conditioner 28 in this implementation includes a first conditioning roll 282 and a second conditioning roll 284, which are rotatably driven and fracture the stems of the cut crop passing therebetween to decrease the drydown time. Then the cut crop, driven by the crop conditioner 28, moves toward the discharge outlet 29. It is noted that the crop conditioner 28 in this implementation, having the first conditioning roll 282 and the second conditioning roll 284, is merely an example. The crop conditioner 28 may be another type. For example, when the crop conditioner 28 is an impeller conditioner, it may have rotating tines picking up the cut crop and the cut crop rubs against a conditioning hood to fracture the stems in order to increase moisture evaporation.

The crop flow control assembly 30 may be disposed at the discharge outlet 29. The crop flow control assembly 30, for instance, may include a swathboard 302 positioned on the top of the discharge outlet 29 and two forming shields 304 positioned, respectively, near the lateral sides of the discharge outlet 29. The swathboard 302 may extend laterally between the forming shields 304 and controls the height or thickness of the windrow WD. The two forming shields 304 may individually guide the cut crop to a different direction, so as change the width and distribution of the windrow. The angular positions of the swathboard 302 and the forming shields 304 may determine the width and depth of the windrow WD returned on the ground and may be adjustable manually or automatically, which will be discussed later.

Referring to FIGS. 1-3, the mower implement 20 may also include a hyperspectral sensor 40 coupled to the main frame 22 of the mower implement 20 and facing rearward and downward to receive reflectance from a target area TA disposed rearward of the header 21 (including the cutter assembly 26, the crop conditioner 28 and the crop flow control assembly 30). The target area TA sensed by the hyperspectral sensor 40, for example, may be circular with a diameter which has a width (i.e., a width S1, FIG. 1). The windrow WD returned by the mower implement 20 has a width S2, which may be varied along the path of the windrow WD. In general, the target area TA includes a portion of the windrow WD laterally, i.e., the width S1 of the target area TA is equal to or greater than the width S2 of the windrow WD. The hyperspectral sensor 40 then generates a signal indicative of light spectrums of the target area TA to be received by a controller 60 for hyperspectral analysis.

The controller 60 is disposed in communication with inputs like the hyperspectral sensor 40 and outputs like a display 72, actuators 74, the drivetrain component 23. The controller 60 is operable to receive signals indicative of light spectrums of the target area TA from the hyperspectral sensor 40 and communicate signal(s) to at least one output such as the display 72, one of the actuators 74, and the drivetrain component 23. While the controller 60 is generally described herein as a singular device, it should be appreciated that the controller 60 may include multiple devices linked together to share and/or communicate information therebetween. Furthermore, it should be appreciated that the controller 60 may be located on the mower implement 20 or located remotely from the mower implement 20.

The controller 60 may alternatively be referred to as a computing device, a computer a control unit, a control module, a module, etc. The controller 60 includes a processor 62, a memory 64, and all software, hardware, algorithms, connections, sensors, etc., necessary to manage and control the operation of the hyperspectral sensor 40, and the output like the display 72, the actuators 74, and the drivetrain component 23. As such, a method may be embodied as a program or algorithm operable on the controller 60. It should be appreciated that the controller 60 may include any device capable of analyzing data from various sensors, comparing data, making decisions, and executing the required tasks.

As used herein, "controller 60" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 60 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 60 may be in communication with other components on the mower implement 20, such as hydraulic components, electrical components, and operator inputs within an operator station of an associated work vehicle, such as a baler implement 80 collecting the windrow WD after drydown. The controller 60 may be electrically connected to these other components by a wiring harness such that messages, commands, and electrical power may be transmitted between the controller 60 and the other components. Although the controller 60 is referenced in the singular, in alternative embodiments the configuration and functionality described herein can be split across multiple devices using techniques known to a person of ordinary skill in the art.

The controller 60 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 60 includes the tangible, non-transitory memory on which are recorded computer-executable instructions, including a windrow width algorithm 601, a windrow distribution algorithm 602 and a machine system control algorithm 603. The processor 62 of the controller 60 is configured for executing the windrow width algorithm 601. The windrow width algorithm 601 implements a method of calculating or estimating the width S2 of the windrow WD. The processor 62 of the controller 60 is configured for executing the windrow distribution algorithm 602. The windrow distribution algorithm 602 implements a method of calculating or estimating the volumetric spread of the windrow WD. The processor 62 of the controller 60 is configured for executing the machine system control algorithm 603. The machine system control algorithm 603 implements a method of operating the machine system 70, including but not limited to the display 72, the actuators 74, and the drivetrain component 23.

The windrow width algorithm 601, the windrow distribution algorithm 602, and the machine system control algorithm 603 may be executed by the processor 62 individually or collectively. In one example, the windrow width algorithm 601 may be processed to calculate the width S2 of the windrow WD and the machine system control algorithm 603 may be processed to display the width S2 of the windrow WD and/or to adjust the width S2 of the windrow through actuators 74, such as but not limited to a swathboard actuator 742 controlling the swathboard 302 and/or a forming shield actuator 744 controlling the forming shield 304. In another example, the windrow distribution algorithm 602 may be processed to calculate the volumetric spread of the windrow WD and the machine system control algorithm 603 may be processed to display the width S2 of the windrow WD and/or to adjust the volumetric spread of the windrow WD through actuators 74, such as but not limited to the swathboard actuator 742 controlling the swathboard 302, the forming shield actuator 744 controlling the forming shield 304, a conditioning actuator 746 controlling the crop conditioner 28, and/or a brake actuator 748 controlling a brake 246 of the mower implement 20. Alternatively or additionally, the machine system control algorithm 603 may be processed to change the running speed of an engine of the drivetrain component 23 or to shift the gears of the transmission of the drivetrain component 23, so as to adjust the volumetric spread of the windrow WD. In another example, the windrow width algorithm 601 and/or the windrow distribution algorithm 602 may include or link to the machine system control algorithm 603 for adjusting the width S2 or volumetric spread of the windrow WD. In another example, the windrow width algorithm 601 may be processed before the windrow distribution algorithm 602. After the width S2 of the windrow WD is determined, the processor 62 executing the windrow distribution algorithm 602 may only need to analyze the pixels of an image within the width S2 of the windrow WD, instead of the pixels of an image of the target area TA having pixels beyond the width S2 of the windrow WD, to the estimate the volumetric spread of the windrow WD. The load of computation is therefore decreased. In another example, the windrow distribution algorithm 602 may include the windrow width algorithm 601; the processor 62 analyzing the pixels of an image of the target area TA not only estimates the volumetric spread of the windrow WD but also estimates the width S2 of the windrow WD, more details are described.

It is noted that to perform the hyperspectral analysis, the hyperspectral sensor 40, instead of RGB camera, is required to measure the light spectrums (e.g., light spectrums beyond visible light) and the controller 60 receives the signal indicative of the spectrums of pixels of image of the target area TA and has at least one algorithm to process the signal. The hyperspectral analysis may identify and classify, based on the amount of reflectance from the target area TA across different wavelengths, certain properties related to the cut crop or the environment around the cut crop, e.g., the ground near or under the cut crop, for further application, such as but not limited to calculating one or more hyperspectral reflectance indices. As to width S2 of the windrow WD estimation, for one example, the reflectance from the cut crop and the reflectance from the ground are different in a band indicative of a chlorophyl level. When the hyperspectral sensor 40 detects the reflectance of chlorophyl from the cut crop stacking on an area of the ground with sufficient amount, the controller 60, based on the signals from the hyperspectral sensor 40, may determine that the cut crop on the area forms a portion of the windrow WD and define the windrow WD and the width S2. On the contrary, when the hyperspectral sensor 40 detects the reflectance of chlorophyl from the cut crop stacking on an area of the ground with no or insufficient amount, the controller 60, based on the signals from the hyperspectral sensor 40, may determine that the cut crop on the area does not form a portion of the windrow WD. One explanatory way for the controller 60 to determine the windrow WD and to estimate the width S2 of the windrow is to calculate the normalized difference vegetation index (NDVI), which is used to indicate a chlorophyl level, based on the signals from the hyperspectral sensor 40.

Similarly, for another width estimation example, the reflectance from the cut crop and the reflectance from the ground are different in a band indicative of a moisture level. When the hyperspectral sensor 40 detects the reflectance of moisture from the cut crop stacking on an area of the ground with sufficient amount, the controller 60, based on the signals from the hyperspectral sensor 40, may determine that the cut crop on the area forms a portion of the windrow WD and define the windrow WD and the width S2. On the contrary, when the hyperspectral sensor 40 detects the reflectance of moisture from the cut crop stacking on an area of the ground with no or insufficient amount, the controller 60, based on the signals from the hyperspectral sensor 40, may determine that the cut crop on the area does not form a portion of the windrow WD. One explanatory way for the controller 60 to determine the windrow WD and to estimate the width S2 of the windrow is to calculate the Normalized difference Water Index (NDWI), which is used to indicate a moisture level, based on the signals from the hyperspectral sensor 40. The processor 62 calculates either the normalized difference vegetation index (NDVI) or Normalized difference Water Index (NDWI) to differentiate the windrow region and the non-windrow region, as a blob analysis technique because of the significant difference in chlorophyl or moisture level between the windrow region and the non-windrow region behind the mower implement 20. It is noted that using NDVI and NDWI to determine the width S2 of the windrow WD are only examples. Other hyperspectral reflectance indices, including but not limited to ratio vegetation index (RVI), soil adjusted vegetation index (SAVI), renormalized difference vegetation index (RDVI), structural insensitive pigment index (SIPI), transformed chlorophyll absorption reflectance index (TCARI), DCNI, may be used for blob analysis to determine the width S2 of the windrow WD. Each hyperspectral reflectance index is indicative of a physical property of the target (reflectance) surfaces, based on light spectrums.

As to estimating the volumetric spread of the windrow WD, the processor 62 is operable to execute windrow distribution algorithm 602 to receive the signal indicative of the light spectrums of the target area TA (including windrow WD) from the hyperspectral sensor 40, to calculate a normalized difference index based on the signal indicative of the light spectrums, and to control the machine system 70 based on the volumetric spread, with the windrow distribution algorithm 602 including the machine system control algorithm 603. Because calculating the volumetric spread of the windrow WD may need to refer to various data for accuracy, such as but not limited to the reflectance of the chlorophyl (e.g. NDVI), the reflectance of the moisture (e.g., NDWI), other hyperspectral reflectance indices, the history data, weather data, the property of the crop, and the reflectance from other objects like certain chemicals, the processor 62 may utilize a transfer function (execute the windrow distribution algorithm 602) to build up mathematical models to generate a normalized difference index based on hyperspectral reflectance indices (e.g., NDVI, NDWI, RVI, SAVI, RDVI, SIPI, TCARI, and/or DCNI) derived from the signal indicative of the light spectrums, and at least one of a historical data related to the target area TA, type of crop, weather, ambient light conditions, etc. The processor 62, in this implementation, is operable to execute the windrow distribution algorithm 603 to calculate the normalized difference index based on at least two hyperspectral reflectance indices derived from the signal indicative of the light spectrums. In another implementation, the processor 62 is operable to execute the windrow distribution algorithm 603 to calculate the normalized difference index based on at least one hyperspectral reflectance index.

Figure 4A:
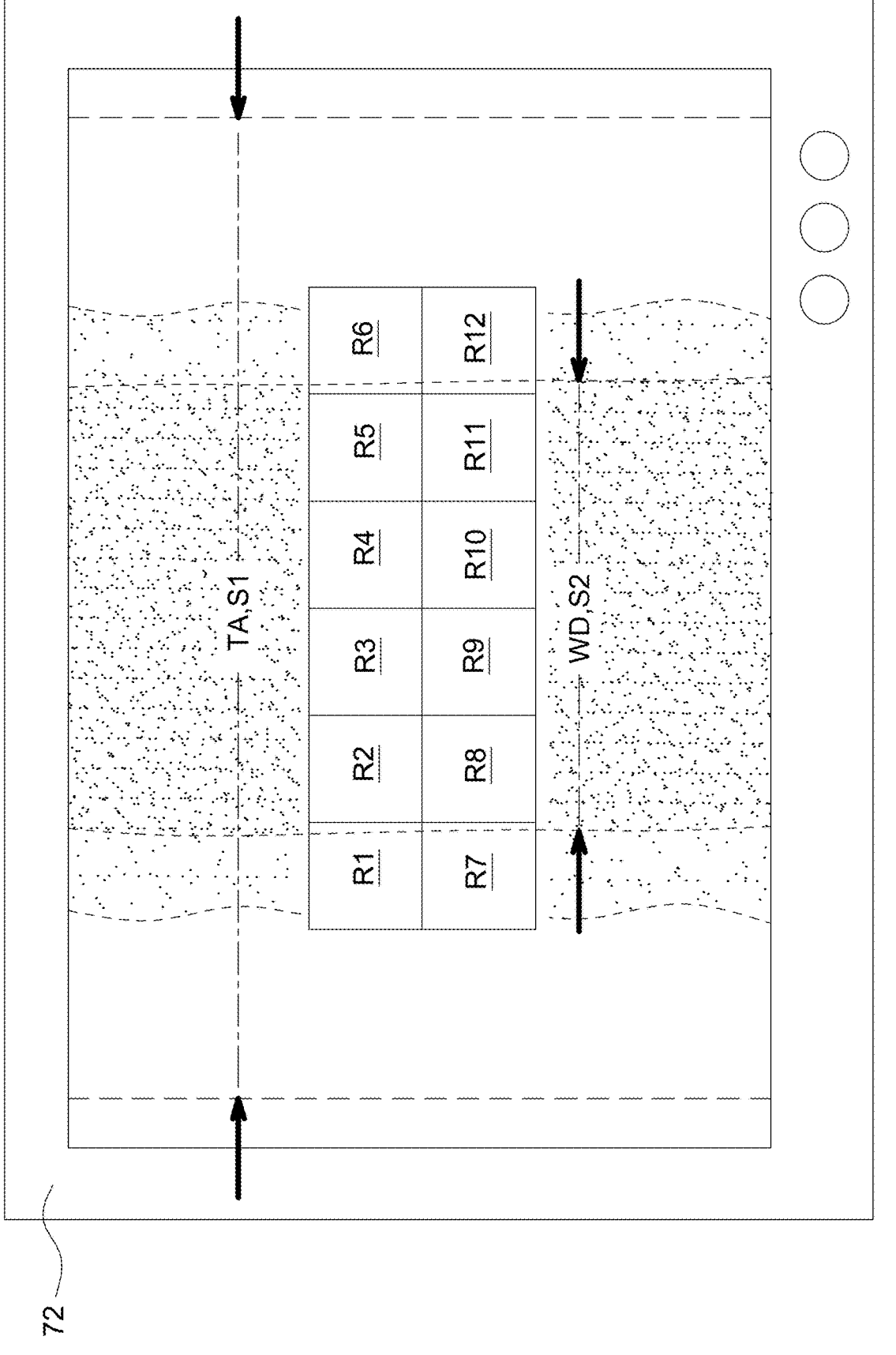
FIG. 4A illustrates a display of an image of the target area accompanied with the two rows and six columns of the subregions illustrated on the image of the target area.
Figure 4B:
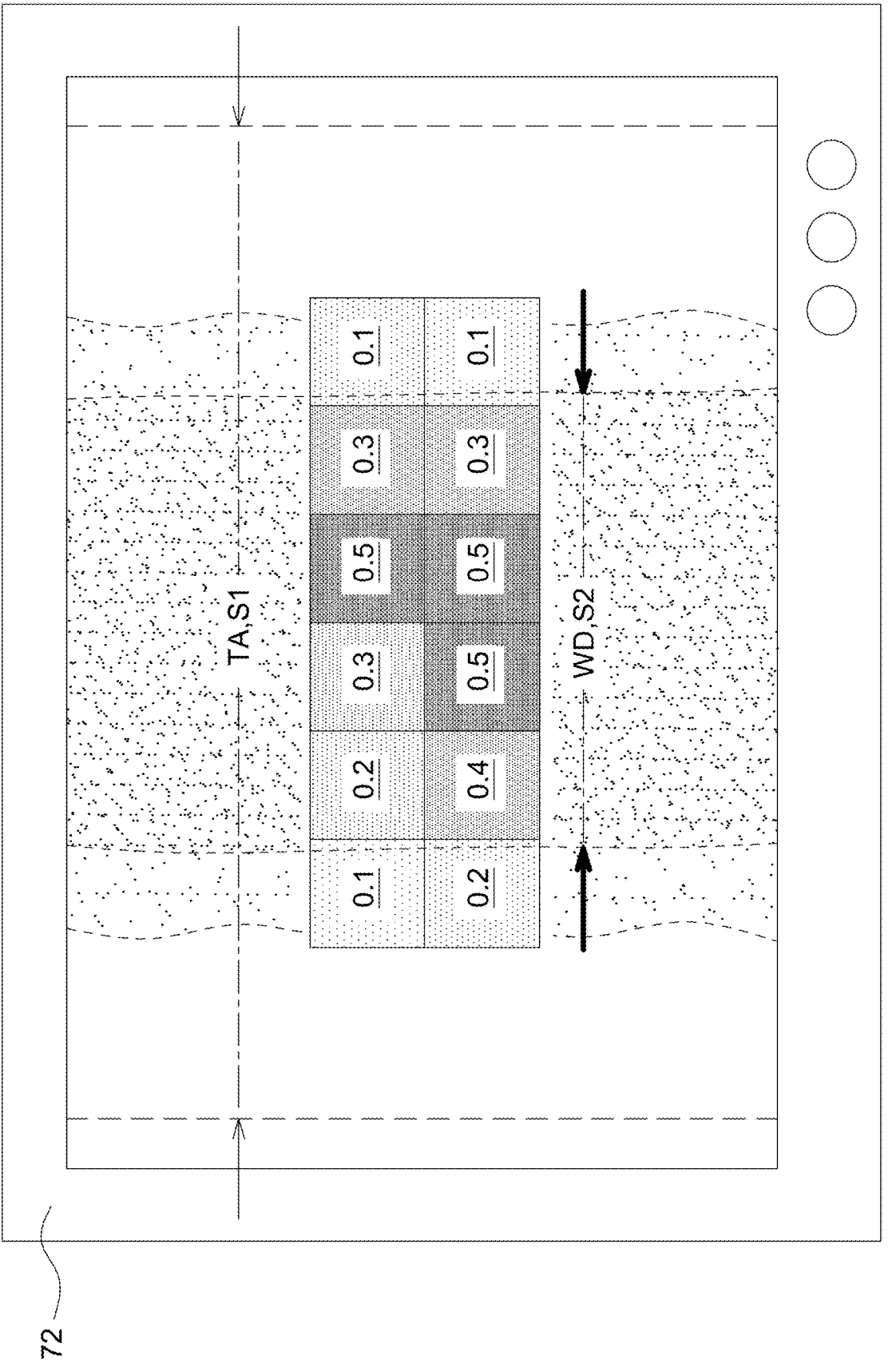
FIG. 4B illustrates the display, after demonstrating FIG. 4A, that displays the subregions with respective translucent colors corresponding to the values of the normalized differ-ence index assigned to the respective subregions.

The values of the normalized difference index may be displayed in a specific way for the operator to understand the distribution of the windrow WD, and for the machine system 70 other than the display 72, such as but not limited to the actuator(s) 74 and the drivetrain component 23 to change the volumetric spread. If the processor 62 has not calculated the width S2 of the windrow WD through the blob analysis (through an individual windrow width algorithm 601 using a single normalized index such as NDVI, NDWI, RVI, SAVI, RDVI, SIPI, TCARI, or DCNI as discussed), the processor 62 may calculate the width S2 of the windrow WD and the volumetric spread of the windrow at the same time through the windrow distribution algorithm 602. In one example, the processor 62 is operable to execute the windrow distribution algorithm 602 to define, simultaneously, at least one row of subregions (e.g., the subregions R1-R12 shown in FIG. 4A) spanning across the width S1 of the target area TA covering the windrow WD based on the signal indicative of the light spectrums of the target area TA, and to assign values of the normalized difference index to the respective subregions to estimate the volumetric spread of the windrow WD. As shown in FIGS. 4A-4B, the display 72 displays an image of the target area TA accompanied with the two rows and six columns of the subregions R1-R12 illustrated on the image of the target TA area with the values of the normalized difference index assigned to the respective subregions R1-R12 later (shown in FIG. 4B). The number of the rows, the number of columns, the total number of the subregions demonstrated in FIGS. 4A, 4B are merely example; they could be different number in another implementation. FIG. 4A may later be replaced by FIG. 4B to show on-going width S2 and volumetric spread of the windrow WD in a specific moment. The memory 64 stores a threshold value of the normalized difference index. For instance, the threshold value is equal to or greater than 0.3. The controller 60 is configured to estimate the width S2 of the windrow WD by aggregating the number of the subregions having their respective values of the normalized difference index being greater than or equal to the threshold value of the normalized difference index (e.g., 0.3). As shown in FIGS. 4A, 4B, because subregions R1, R6, R7, R12 are below 0.3 and the subregions R2-R5 and R8-R11 are continuous arranged and equal to or greater than 0.3, the width S2 of the windrow WD is the summary of lateral distance of subregions R2-R5 or subregions R8-R11. FIG. 4B illustrates that the display 72 displays the subregions R1-R12 with respective translucent colors corresponding to the values of the normalized difference index; the greater value of the normalized difference index, the darker the subregions R1-R12, or vise versa. The greater value of the normalized difference index also indicates more cut crop laid on the gourd. Therefore, in an implementation of an open loop control, after seeing the values of the normalized difference index are with great variance (or darkness of those subregions defined within the width S2 of windrow WD are different in great extent), the operator may adjust the volumetric spread of the windrow WD manually by changing the angle of the crop flow control assembly 30 (e.g., the angle of the swathboard 302 and the angle of forming shield(s) 304), the crop conditioner 28, the travel speed of the mower implement 20, for example. In an implementation of a closed loop control, based on the values of the normalized difference index, the machine system control algorithm 603 (included by the windrow distribution algorithm 602) may be processed to adjust the volumetric spread of the windrow WD through actuators 74 or speed of the mower implement 20, as discussed previously. The memory 64 may store a variance threshold, and the controller 60 may calculate the values of the normalized difference index of the subregions R1-R12 and calculate a variance sampled from values of the normalized difference index of the subregions R1-R12. When variance is greater than or equal to the variance threshold, the controller 60 transmits a signal to the conditioning actuator 746 to decrease the processing gap (for example, the gap between the conditioning hood and the tines in impeller conditioner or the gap between the two conditioning rolls) and a signal to the drivetrain component 23 or the brake actuator 748 or brake 246 to decrease a speed of travel. Lowering the speed of the mower implement 20 and/or narrowing the gap between the first and second conditioning rolls 282, 284 may decrease the variance of the windrow WD in the lateral direction.

It is noted that if the processor 62 has calculated the width S2 of the windrow WD through the blob analysis (an individual windrow width algorithm 601 using a single normalized index such as NDVI or NDWI), the memory 64 has the windrow width algorithm 601 stored therein, and the processor 62 is operable to execute the windrow width algorithm 601 to analyze the blob based on the signal indicative of the light spectrums of the target area TA. The completion of estimating the width S2 of the windrow WD would allow the controller 60 to define the row of the subregions only on the width of the windrow WD to decrease load of computation for estimating the volumetric spread of the windrow WD. In other words, the processor 62 executing the windrow distribution algorithm 602 may only need to analyze the pixels of the image within the width S2 of the windrow WD to the estimate the volumetric spread of the windrow WD. The number of columns of the subregions defined by the processor 62 may be decreased. In addition, in another implement, the data, such as the label of the subregions, the values of the normalized difference index assigned to the subregions, the darkness of the subregions, for example, may be shown together in the display 72 at the same time.

Figure 5A:
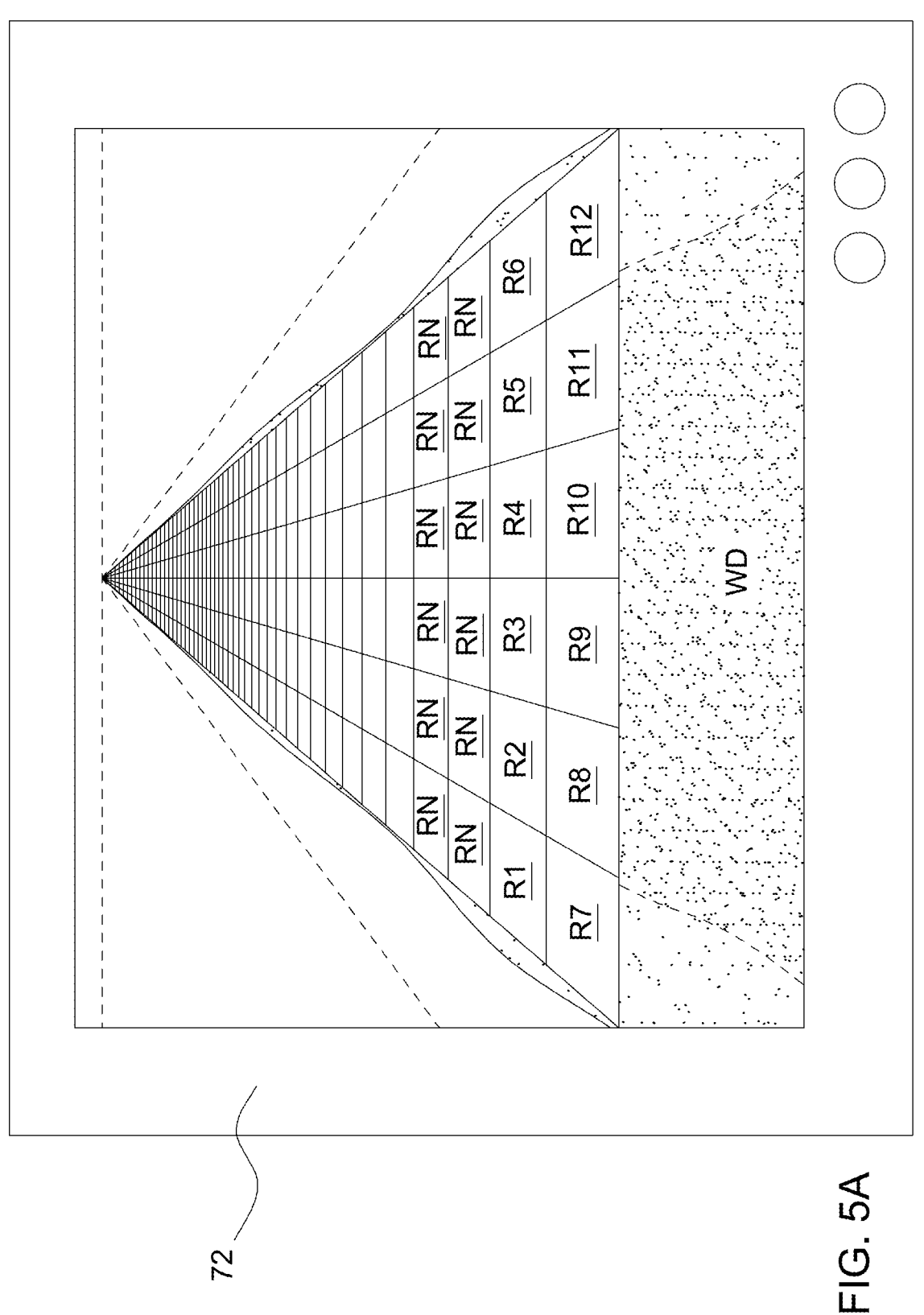
FIG. 5A illustrates the display that displays a map com-prising multiple subregions along the windrow away from the mower implement.
Figure 5B:
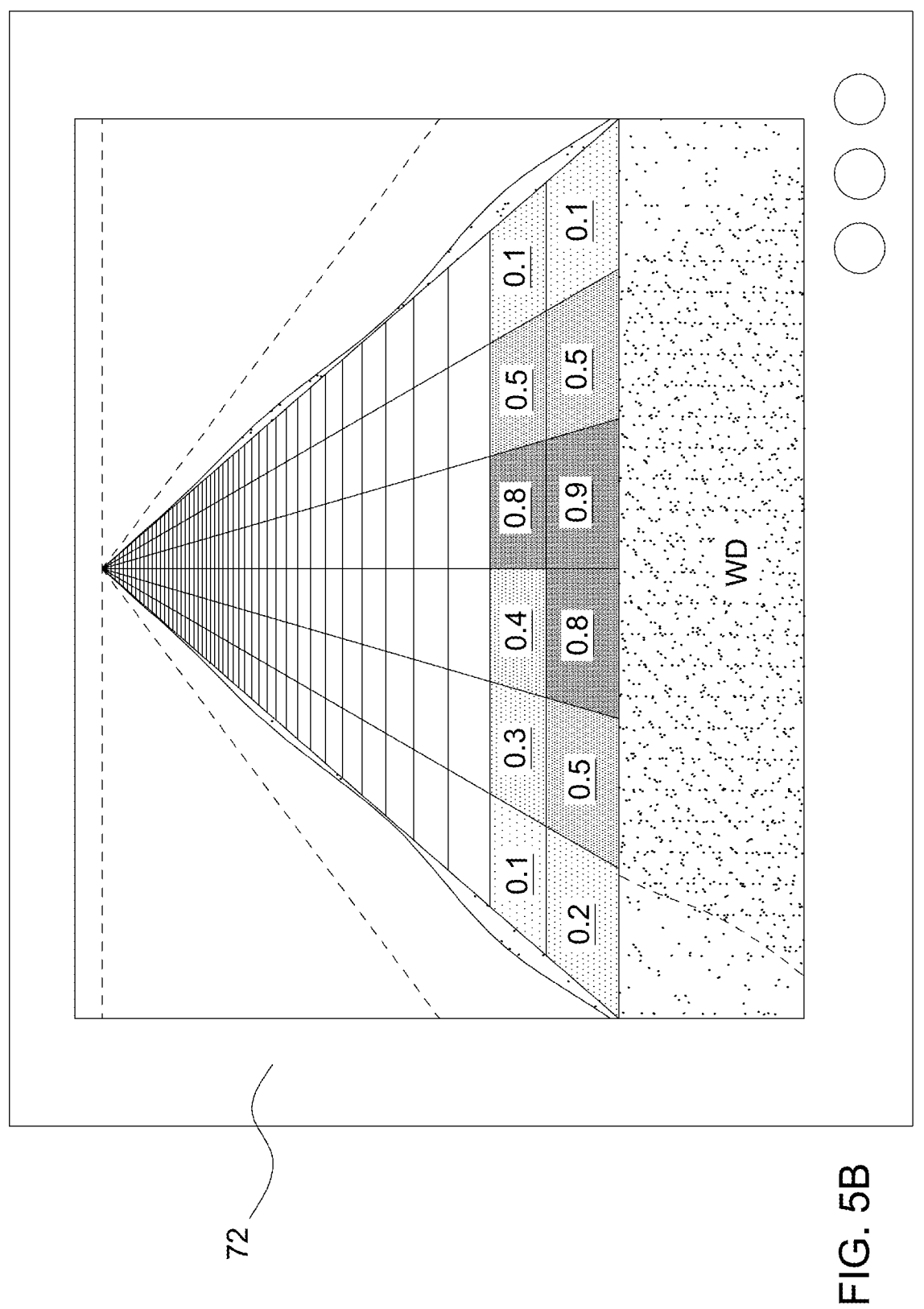
FIG. 5B illustrates the display, after demonstrating FIG. 5A, that displays another map to replace or to supplement the map in FIG. 5A to show multiple subregions with respective translucent colors corresponding to the values of the normalized difference index assigned to the respective subregions.

The total number of subregions, the number of the rows of the subregions, the number of the columns of the subregions in the specific moment illustrated in FIG. 4A or 4B are only for illustration. However, when the mower implement 20 forms the windrow WD with sufficient length, the controller 60 may generate a map having multiple rows of subregions along the path of the windrow. Referring to FIG. 5A, the controller 60 defines multiple rows of subregions across the width of the windrow WD or the width of the target area TA covering the windrow WD to form a map based on the signal indicative of light spectrums of the target area TA and a signal indicative of light spectrums of an updated target area TA following the target area TA from the hyperspectral sensor 40. As shown in FIG. 5B, the controller 60 assigns values of the normalized difference index, non-simultaneously, to the respective subregions to generate another map of estimated volumetric spread of the windrow WD. As discussed, the values of the normalized difference index and the maps may be transfer to a controller (such as the controller 60) to determine the operation of the baler implement 80. It is noted that subregion RN shown in FIGS. 5A, 5B may be referred to any subregions.

Figure 6:
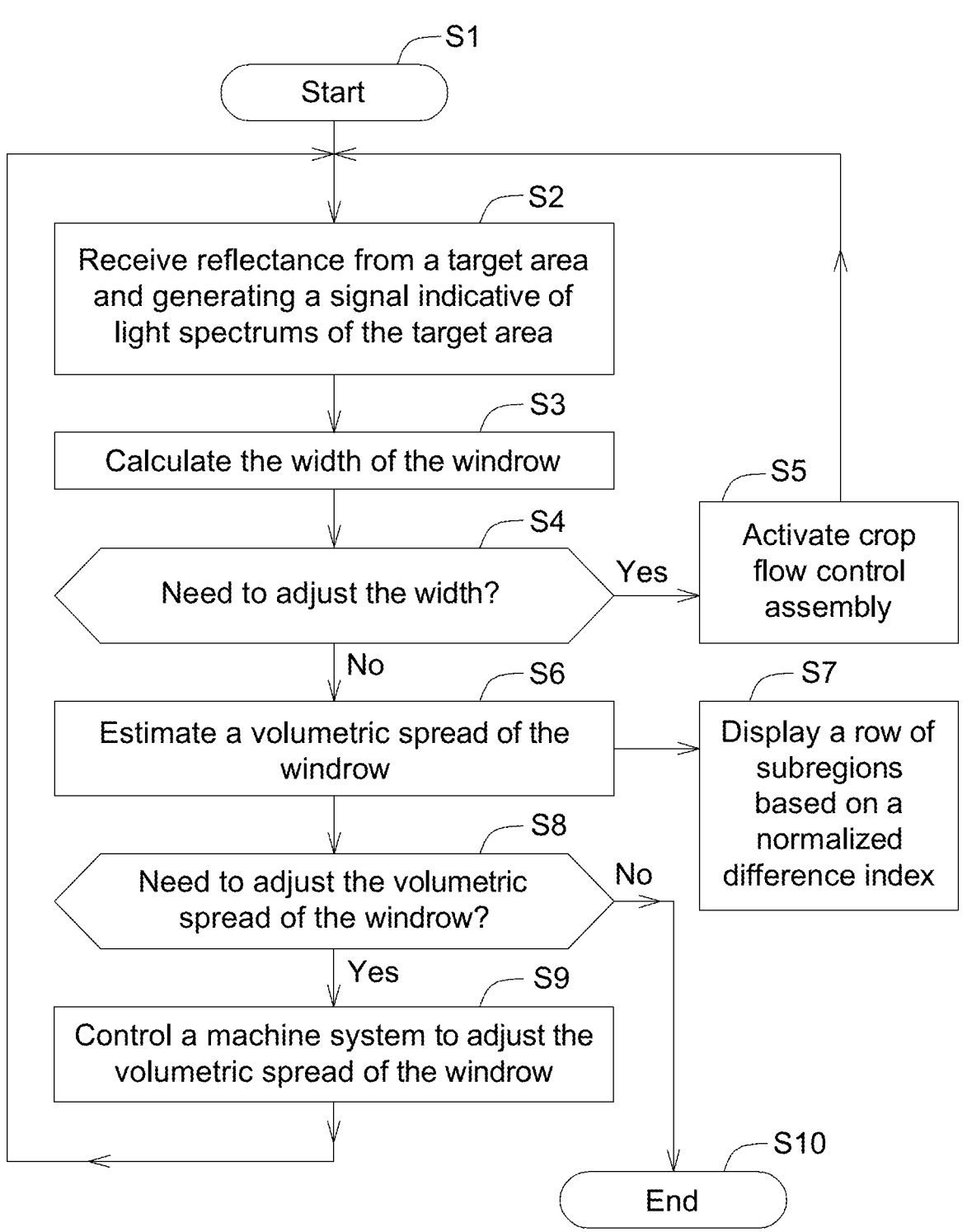
FIG. 6 illustrate a flow chart of the width of the windrow estimation and volumetric spread of the windrow estimation.

FIG. 6 is a flow chart of the width of the windrow estimation and/or volumetric spread of the windrow estimation. Boxes S1-S10 shown in FIG. 6 are described in greater detail below.

S1: Start.

S2: Receive reflectance from a target area and generating a signal indicative of light spectrums of the target area by a hyperspectral sensor.

S3: Calculate the width of the windrow based on the signal indicative of light spectrums by a controller.

S4: Need to adjust the width of the windrow? If yes, go to S5; if no, go to S6.

S5: Activate crop flow control assembly to adjust the width of the windrow. Then go to S2. The crop flow control assembly may be adjusted by the controller (closed loop). Alternatively, the crop flow control assembly may be adjusted manually (open loop).

S6: Estimate a volumetric spread of the windrow. The controller may calculate a normalized difference index based on signal indicative of the spectrums of the target area. The controller may define, simultaneously, a row of subregions across a width of the windrow or a width of the target area covering the windrow based on the signal indicative of light spectrums of the target area. The controller may assign values of the normalized difference index to the respective subregions to estimate the volumetric spread of the windrow.

S7: Display a row of subregions based on a normalized difference index by a display. The display may display an image of the target area accompanied with the row of the subregions illustrated on the image of the target area with the values of the normalized difference index assigned to the respective subregions.

S8: Need to adjust the volumetric spread of the windrow? If yes, go to S9; if no, go to S10. The controller may calculate a variance sampled from the values of the normalized difference index of the subregions.

S9: Control a machine system to adjust the volumetric spread of the windrow by the controller. When variance is greater than or equal to a variance threshold, the controller transmits a signal to the machine system. Then go to S2 (closed loop control). Alternatively, the machine system may be adjusted manually (open loop).

S10: End.

S1-S5 related to width of the windrow estimation and adjustment can be performed before the volumetric spread of the windrow estimation. In other words, estimating the width of the windrow to limit the controller defining the row of subregions from the width of the target area to the width of the window to decrease load of computation for estimating the volumetric spread of the windrow.

In another implementation, only S1-S5 may be performed. In another implementation, S4 and S6 are performed at the same time when normalized difference index is calculated. In another implementation, S4 is performed prior to S6 by using blob analysis.

Without in any way limiting the scope, interpretation, or application of the claims appearing below, a technical effect of one or more of the example embodiments disclosed herein is to estimate width of the windrow and the volumetric spread of the windrow. Another technical effect of one or more of the example embodiments disclosed herein is decrease the load of the computation of the processor if the width of the window is estimated prior to the estimation of the volumetric spread of the windrow. Another technical effect of one or more of the example embodiments disclosed herein is to provide another agriculture implement, such as baler implement, a map of volumetric spread along the path of the windrow.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally," "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A mower implement comprising:
a main frame;
a cutter assembly coupled to the main frame and operable to cut a crop material and form the cut crop material into a windrow;
a hyperspectral sensor coupled to the main frame and configured to receive reflectance from a target area disposed rearward of the cutter assembly and including the windrow, and to generate a signal indicative of light spectrums of the target area;
a controller having a processor and a memory having a windrow distribution algorithm stored therein, wherein the processor is operable to execute the windrow distribution algorithm to:
receive the signal indicative of the light spectrums of the target area from the hyperspectral sensor;
calculate a normalized difference index based on the signal indicative of the light spectrums of the target area;
estimate a volumetric spread of the windrow; and
control a machine system based on the volumetric spread, the machine system includes one of a display, an actuator, and a drivetrain component;
wherein the processor is operable to execute the windrow distribution algorithm to define, simultaneously, a row of subregions spanning across a width of the windrow or a width of the target area covering the windrow based on the signal indicative of the light spectrums of the target area, and to assign values of the normalized difference index to the respective subregions to estimate the volumetric spread of the windrow.

2. The mower implement of claim 1, wherein the display displays an image of the target area accompanied with the row of the subregions illustrated on the image of the target area with the values of the normalized difference index assigned to the respective subregions.

3. The mower implement of claim 2, wherein the display displays the subregions with respective translucent colors corresponding to the values of the normalized difference index.

4. The mower implement of claim 1, wherein the processor is operable to execute the windrow distribution algorithm to calculate the normalized difference index based on at least two hyperspectral reflectance indices derived from the signal indicative of the light spectrums.

5. The mower implement of claim 4, wherein the processor is operable to execute the windrow distribution algorithm to calculate the normalized difference index based on a normalized difference vegetation index (NDVI) and normalized difference water index (NDWI) derived from the signal indicative of the light spectrums.

6. The mower implement of claim 4, wherein the memory has a windrow width algorithm stored therein and the processor is operable to execute the windrow width algorithm to analyze a blob based on the signal indicative of the light spectrums of the target area to estimate the width of the windrow so as to define the row of the subregions only on the width of the windrow estimated by the controller to decrease load of computation for estimative the volumetric spread of the windrow.

7. The mower implement of claim 4, wherein the memory stores a threshold value of the normalized difference index, and the controller is configured to estimate the width of the windrow by aggregating the number of the subregions having their respective values of the normalized difference index being greater than or equal to the threshold value of the normalized difference index.

8. The mower implement of claim 4, wherein the normalized difference index is calculated by the controller based on at least one of a historical data related to the target area, type of crop, weather, and ambient light conditions.

9. The mower implement of claim 1, wherein the mower implement includes a crop conditioner operable to condition the cut crop material prior to forming the crop material into the windrow.

10. The mower implement of claim 9, wherein the actuator is coupled to the crop conditioner and configured for controlling a processing gap of the crop conditioner.

11. The mower implement of claim 10, wherein the memory stores a variance threshold, the controller calculates the values of the normalized difference index of the subregions, calculates a variance sampled from the values of the normalized difference index of the subregions, and when the variance is greater than or equal to the variance threshold, the controller transmits a signal to the actuator to decrease the processing gap and a signal to the drivetrain component or a brake to decrease a speed of travel.

12. The mower implement of claim 1, wherein an operation of a baler implement is determined by the normalized difference index.

13. The mower implement of claim 1, wherein the controller defines multiple rows of subregions across the width of the windrow or the width of the target area covering the windrow based on the signal indicative of the light spectrums of the target area and a signal indicative of light spectrums of an updated target area following the target area from the hyperspectral sensor and assigns values of the normalized difference index, non-simultaneously, to the respective subregions to generate a map of estimated volumetric spread of the windrow.

14. The mower implement of claim 13, wherein an operation of a baler implement is determined by the map.

15. A method of controlling a machine system of a mower implement, the method comprising:
receiving reflectance from a target area covering a windrow by a hyperspectral sensor;
generating a signal indicative of light spectrums of the target area by the hyperspectral sensor;
receiving the signal indicative of the light spectrums of the target area from the hyperspectral sensor, calculating a normalized difference index based on signal indicative of the light spectrums of the target area, estimating volumetric spread of the windrow, and controlling a machine system based on the volumetric spread by a controller to adjust the volumetric spread of the windrow by the controller;
defining, simultaneously, a row of subregions across a width of the windrow or a width of the target area covering the windrow based on the signal indicative of light spectrums of the target area; and assigning values of the normalized difference index to the respective subregions to estimate the volumetric spread of the windrow.

16. The method of controlling the machine system of the mower implement of claim 15, further comprising displaying an image of the target area accompanied with the row of the subregions illustrated on the image of the target area with the values of the normalized difference index assigned to the respective subregions by a display.

17. The method of controlling the machine system of the mower implement of claim 15, further comprising calculating the normalized difference index, by the controller, based on a normalized difference vegetation index (NDVI) and a normalized difference water index (NDWI) based on the signal indicative of the light spectrums.

18. The method of controlling the machine system of the mower implement of claim 16, further comprising estimating the width of the windrow to limit the controller defining the row of subregions from the width of the target area to the width of the windrow to decrease load of computation for estimating the volumetric spread of the windrow.

\*    \*    \*    \*    \*